United States Patent [19]
Leidy

[11] Patent Number: 6,076,654
[45] Date of Patent: Jun. 20, 2000

[54] GLASS CONTAINER HANDLING SYSTEM

[75] Inventor: D. Wayne Leidy, Perrysburg, Ohio

[73] Assignee: Owens-Brockway Glass Container Inc., Toledo, Ohio

[21] Appl. No.: 09/055,512

[22] Filed: Apr. 6, 1998

[51] Int. Cl.[7] .................................................. B65G 25/00
[52] U.S. Cl. .................. 198/429; 198/457.06; 198/502.3
[58] Field of Search .............................. 198/370.11, 429, 198/430, 457.03, 457.06, 468.01, 493, 502.3, 575, 577

[56] References Cited

U.S. PATENT DOCUMENTS

| | | | |
|---|---|---|---|
| 3,258,104 | 6/1966 | Walkden | 198/429 |
| 4,180,153 | 12/1979 | Krishnan et al. | 198/493 |
| 4,193,784 | 3/1980 | Mumford | 198/429 |
| 4,203,752 | 5/1980 | Becker et al. | 198/468.01 |
| 4,448,820 | 5/1984 | Buschor | 198/502.3 |
| 5,044,488 | 9/1991 | Bolin | 198/430 |
| 5,429,651 | 7/1995 | Bolin | 198/430 |
| 5,768,856 | 12/1996 | Odenthal | 198/430 |

*Primary Examiner*—Joseph E. Valenza

[57] ABSTRACT

Glass containers are transferred from the dead plates of a forming machine of the I.S. type to an adjacent machine conveyor by 90° sweepouts, each of which is powered by an a.c. servo motor. The machine conveyor, which is also powered by an a.c. servo motor, conveys containers to a cross-conveyor, which extends perpendicularly to the machine conveyor and conveys the containers to positions adjacent the inlet of an annealing lehr. The transfer of containers from the machine conveyor to the cross-conveyor is effected by a chain transfer device, and the cross-conveyor and the chain transfer device are each powered by an a.c. servo motor. Groups of containers are transferred in unison from the cross-conveyor to a moving conveyor of the annealing lehr by the reciprocating pusher bar of a lehr loader, and the operation of the lehr loader pusher bar which reciprocates along three (3) axes, powered by three (3) a.c. servo motors. The operation of each of the a.c. servo motors for the 90° sweepouts, the machine conveyor, the cross-conveyor, chain transfer device and the lehr loader pusher bar, and the operation of the annealing lehr, which is powered by an a.c. motor, conveyor is simultaneously measured and controlled to process containers at all times from the forming machine dead plates to the annealing lehr conveyor at predetermined controlled rates.

12 Claims, 2 Drawing Sheets

GLASS CONTAINER HANDLING SYSTEM

FIELD OF THE INVENTION

This invention relates to a system for controlling the operation of the various handling devices for handling and transferring glass containers from a forming machine of the individual section ("I.S.") type to an annealing lehr.

BACKGROUND OF THE INVENTION

Many, if not most, glass containers, including a wide variety of bottles and jars, are, and for many years have been, manufactured by machines of the I.S. type, a type that uses a multiplicity of side-by-side sections each of which forms containers in a two-step molding operation. In a glass container forming operation of this type, a preform of the container, often called a parison or a blank, is formed in a first mold at a blank molding station of the I.S. machine section, either by pressing or blowing, and the blank is then transferred by a 180° inverting operation in a vertical plane to a second mold of the I.S. machine section, often called a blow mold, for forming into the finished container by blowing. In modern I.S. machines typically a multiplicity of containers, such as two or three or even four containers, are simultaneously formed at each section of the I.S. machine, and such machines typically incorporate a rather large number of sections, such as six or eight or even ten sections. U.S. Pat. No. 4,427,431 (Mumford et al.), which is assigned to the assignee of this application, the disclosure of which is incorporated by reference herein, generally discloses a glass container forming machine of this general type.

Containers leaving the blow molds of an I.S. machine are quite hot and need to be cooled to an appreciable extent before they can be subjected to the kinds of mechanical handling steps and devices that are necessary to transfer such containers to an annealing lehr for heat treatment to relieve excess residual internal stresses that can result from the forming steps. Thus, a typical I.S. machine is provided with an air cooled dead plate to which containers are transferred from the blow molds of an I.S. machine by take-out tong mechanisms that are a part of the I.S. machine. The containers are permitted to dwell on the dead plate for a period of time, during which they partially cool to a temperature at which they will be capable of undergoing further handling. Thereupon, the containers are transferred to a moving conveyor, often called a machine conveyor, an action that requires a 90° turning movement of the containers by a sweepout head. The transfer of containers from I.S. machine blow molds to dead plates and from dead plates to a machine conveyor by sweepout heads is generally described in the aforesaid U.S. Pat. No. 4,427,431 and also in U.S. Pat. No. 4,162,911 (Mallory) and U.S. Pat. No. 4,222,480 (Perry), each of which is also assigned to the assignee of this application, the disclosure of each of which is also incorporated by reference herein.

Containers from an I.S. machine that are being conveyed away from the I.S. machine by the machine conveyor are transferred to another conveyor, usually called a cross-conveyor, which extends perpendicular to the machine conveyor and presents the containers at the inlet to an annealing lehr. A container transfer device is provided to effect the transfer of containers from the machine conveyor to the cross-conveyor. This arrangement is generally shown in U.S. Pat. No. 4,193,784 (Mumford), which is also assigned to the assignee of this application, the disclosure of which is also incorporated by reference herein. In practice, transfer devices performing the function of the transfer device of the aforesaid U.S. Pat. No. 4,193,784 are often constructed in an arcuate or crescent-shape configuration. Containers on the cross-conveyor at the inlet to an annealing lehr are thereupon transferred in groups of a multiplicity of containers in each group to a moving conveyor of the lehr by a transfer device that is often called a lehr loader or stacker. U.S. Pat. No. 4,290,517 (Hafferkamp), which is also assigned to the assignee of this application, the disclosure of which is also incorporated by reference herein, discloses a prior art lehr loader for transferring containers on a cross-conveyor to the conveyor of an annealing lehr in the manner described above.

The many container handling steps and devices involved in transferring containers from I.S. machine dead plates to an annealing lehr conveyor, as described, must be carefully controlled with respect to one another, both as to the speeds of such handling steps and their timing with respect to one another. Further, I.S. machines, as described, are used to produce containers of different designs and sizes, and each job change on an I.S. machine often requires changes in the system for controlling the operation of the container handling devices, frequently involving changes in the spacing between containers on the machine conveyor and the cross-conveyor. Heretofore, such I.S. machine job changes involved changing the gearbox and/or the sprocket ratios of the drives used to drive the machine conveyor, the cross-conveyor and the chain transfer device for transferring containers from the machine conveyor to the cross-conveyor. Of course, such changes lead to significant downtime in the operation of an I.S. machine, which reduces the overall productivity of the machine. Moreover, even in steady state operation, variables can occur in the operation of container handling devices, as described, do, for example, to stretch occurring in the conveyor belts used in some of such devices.

SUMMARY OF THE INVENTION

According to the present invention there is provided a control system for controlling the operation of the various container handling operations and devices that are involved in transferring containers from the dead plates of an I.S. machine to a moving conveyor of an annealing lehr. The handling system of the present invention utilizes a central control station that simultaneously controls the operation of the I.S. machine sweepouts, the machine conveyor, the chain transfer device, the cross-conveyor and the lehr loader, each of which is preferably driven by an a.c. servo motor for precise control over its operation. The central control station also controls the operation of the lehr conveyor driver, which is typically an a.c. motor but not an a.c. servo motor. The central control station of the present invention is programmed to permit an operator to provide it with a desired container-to-container spacing between containers being transferred to a lehr, and each of the handling devices being controlled by the central control station will thereupon be adjusted in its operation to conform to such container-to-container spacing. Further, the control system of the present invention employs monitors for monitoring the linear speeds of the machine conveyor and the cross-conveyor, which can vary even during steady state operation due to stretching of the conveyor belts, and will change the linear speed of each such belt as required to conform its operation to that of its associated handling devices. Additionally, the operating information for the various handling devices involved in handling containers of any particular design and size can be electronically recorded, for example, on a floppy disk, and the control system can bring the various handling devices to their proper operating conditions very quickly when the line is next adjusted to process containers of that design and size. The control system of the present invention can also be used to control the operation of a container blowoff device of a type used to discharge containers in the event of a line stoppage.

Accordingly, it is an object of the present invention to provide an improved control system for controlling the operation of the various container handling devices involved in transferring glass containers from the dead plates of an I.S. forming machine to an annealing lehr conveyor. More particularly, it is an object of the present invention to provide a control system of the foregoing character that can quickly modify the operations of the devices controlled by it when there is a change in the design or size of containers being formed on the associated I.S. machine. It is also an object of the present invention to provide a control system that is capable of controlling the operation of conveyors used in the transfer of containers from an I.S. machine to annealing lehr to take into account any changes in the linear speed of any such conveyor due to stretching.

For a further understanding of the present invention and the objects thereof, attention is directed to the drawing and the following brief description thereof, to the detailed description of the preferred embodiment of the invention and to the appended claims.

IN THE DRAWING

FIG. 1 is a fragmentary plan view, partially schematic, illustrating a glass container handling system for transferring glass containers from the dead plates of an I.S. forming machine to the moving conveyor of an annealing lehr, and embodying a control system according to the preferred embodiment of the present invention; and FIG. 2 is a schematic view of a system for adjusting the setpoint at which a controller controls the operation of an electric motor used in the handling system of FIG. 1.

DETAILED DESCRIPTION OF THE PREFERRED EMBODIMENT

Figure 1:
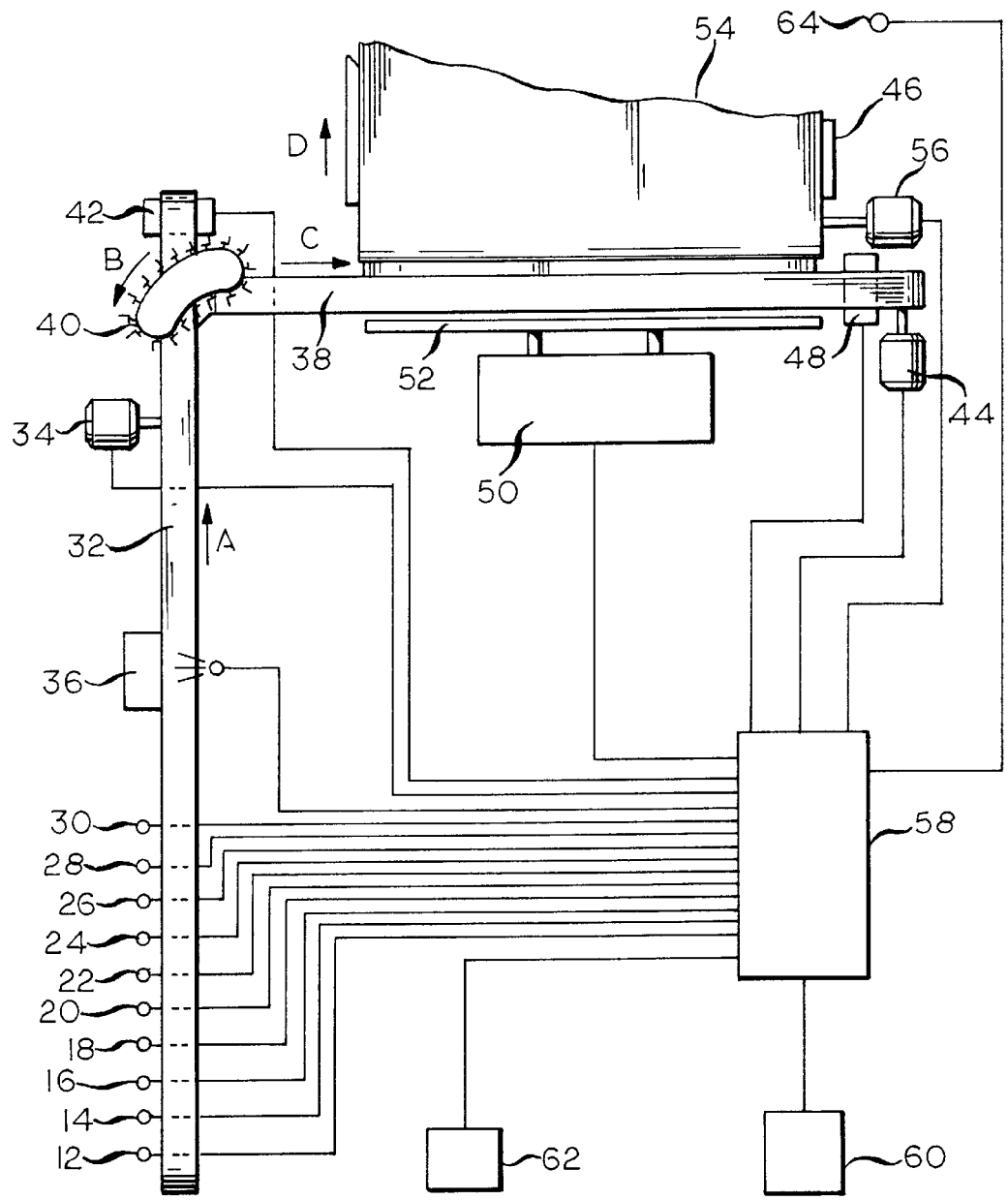

Reference numbers 12, 14, 16, 18, 20, 22, 24, 26, 28, 30 schematically identify sweepouts used to transfer glass containers from the dead plates of an I.S. machine, the number of such sweepouts indicating that the I.S. machine, as shown, is of the ten-section type. The sweepouts 12, 14, 16, 18, 20, 22, 24, 26, 28, 30 are used to transfer containers from the I.S. machine dead plates to the upper flight of an endless machine conveyor 32, which is continuously driven by an a.c. motor 34, which preferably is an a.c. servo motor, to move the upper flight of the conveyor 32 from the bottom to the top in the orientation shown in the drawing as noted by the arrow A. A container blowoff station 36 is provided at a location adjacent to the conveyor 32 to permit containers on the conveyor 32 to be pneumatically discharged for recycling or disposal in the event of a stoppage of any of the container handling devices located downstream of the conveyor 32, as hereinafter described.

Containers are transferred from the machine conveyor 32, where they are conveyed in a single row, to a cross-conveyor 38, which extends perpendicularly of the machine conveyor 32. The transfer of containers from the machine conveyor 32 to the cross-conveyor 38 is effected by an endless transfer device 40, which is shown as being of the curved chain type and is also powered by an a.c. motor (not shown), which preferably is also an a.c. servo motor. The direction of motion of the chain transfer device 40 is illustrated by the arrow B in the drawing. A belt speed monitor 42 is provided to continuously measure the speed of the machine conveyor 32, and the monitor 42 is preferably positioned along the machine conveyor 32 at a location downstream from the chain transfer device 40. The cross-conveyor 38 is an endless conveyor which is driven by an a.c. motor 44, which preferably is also an a.c. servo motor. The cross-conveyor 38 has an upper flight that moves from left to right in the orientation illustrated in the drawing and as indicated by the arrow C, and is used to present containers in a single file in front of an inlet to an annealing lehr 46. A belt speed monitor 48 is provided to continuously measure the linear speed of the cross-conveyor 38, and the monitor 48 is preferably positioned along the cross-conveyor at a location downstream of the annealing lehr 46.

Groups of containers are transferred in unison into the lehr 46 by a reciprocating lehr loader 50, whose reciprocating operation toward and away from the lehr 46 is powered by an a.c. motor (not shown), which preferably is also an a.c. servo motor. In actuality, the lehr loader 50 requires motion along three axes, a vertical axis and horizontal axes along X and Y coordinates, and three (3) such a.c. motors, which are synchronized with one another, are provided to effect such motions. In any case, containers are engaged by a pusher bar 52 carried by the lehr loader 50 and are moved from the cross-conveyor 38 to an endless wire mesh conveyor 54, which is driven by an a.c. motor 56. The conveyor 54 of the lehr 46 has an upper flight on which containers from the cross-conveyor 38 are supported, and the upper flight of the conveyor 54 moves from bottom to top in the orientation shown in the drawing as illustrated by the arrow D to convey the containers through the lehr 46. A belt speed monitor 64 is provided to continuously monitor the linear speed of the lehr conveyor 54.

A powered central controller 58 is provided to simultaneously measure and control the operation of each of the sweepouts 12, 14, 16, 18, 20, 22, 24, 26, 28, 30, the bottle blowoff station 36, the a.c. motor 34 for the machine conveyor 32, the a.c. motor for the chain transfer device 40, the a.c. motor 44 for the cross conveyor 38, the a.c. motors for the lehr loader 50, and the a.c. motor 56 for the conveyor 54 of the annealing lehr 46, as indicated by the solid lines from the controller 58 to each such device. The controller 58 receives instructions from an operator's station 60 as to the desired operating speeds of each of the devices controlled by it, as described, based. for example, on the design or size of containers being processed at any given time. The controller 58 thereupon automatically controls each of the control devices to operate at rates of operation that are coordinated with one another and are appropriate for containers of the design and size being processed. The operation of a controller 58, together with the operation of all of the devices controlled by it, as described, is activated by a main start/stop station 62, and the entire control system including the controller 58 can be deactivated by the start/stop station 62.

The operating speeds of the machine conveyor 32 and the cross-conveyor 38, as controlled by the central controller 58, may need to be changed from time to time even during steady state operation due to stretching of the machine conveyor 32 and/or the cross-conveyor 38 if the machine conveyor 32 and the cross-conveyor 38 are in the form of belts, which is the typical arrangement. The machine conveyor belt speed monitor 42 provides the controller 58 with a signal indicative of the linear speed of the machine conveyor 32, which will change as the machine conveyor 32 stretches, and the controller 58 will then instruct the a.c. motor 34 to operate at a different speed to compensate for the change in the linear speed of the machine conveyor 32 due to belt stretching. Likewise, the cross-conveyor belt speed monitor 48 will provide the controller 58 with a signal indicative of the linear speed of the cross-conveyor 38, which will change as the cross-conveyor 38 stretches, and the controller 58 will then instruct the a.c. motor 34 to operate at a different speed to compensate for the change in the linear speed of the cross-conveyor 38 due to belt stretching. Similarly, the belt speed monitor 64 provides the controller 58 with a signal indicative of the linear speed of the lehr conveyor 54, which will change as the lehr conveyor 54 stretches, and the controller 58 will then instruct the a.c. motor 56 to operate at a different speed to compensate for the change in the linear speed of the lehr conveyor 54 due to belt stretching.

Figure 2:
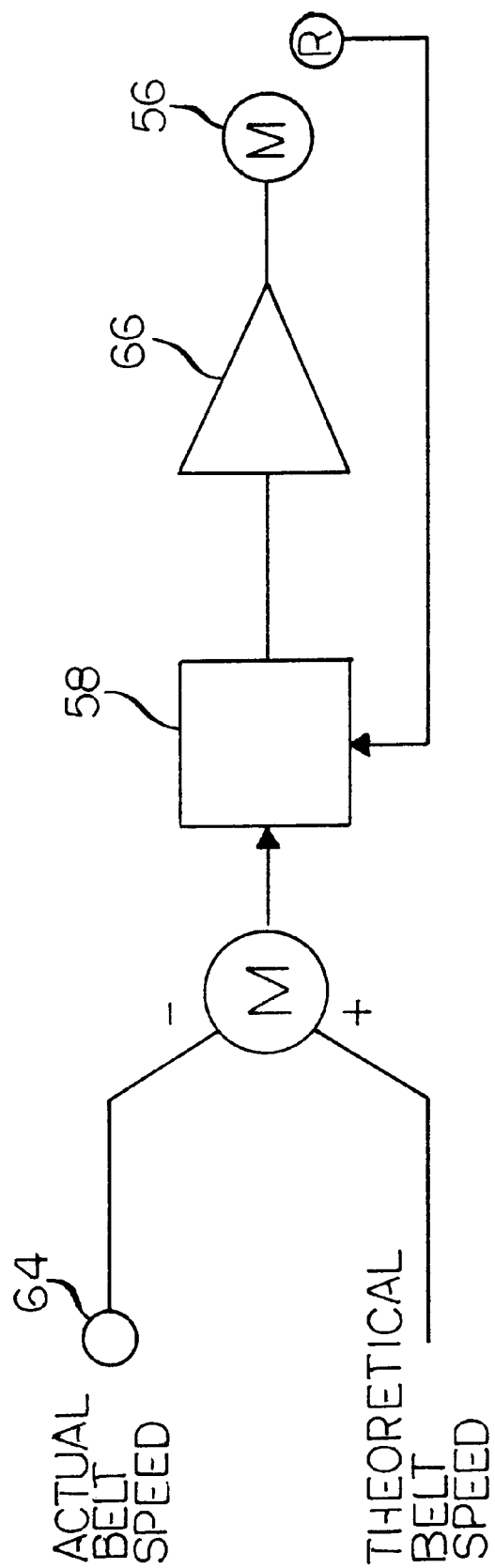

FIG. 2 illustrates a system for adjusting the setpoint at which the controller 58 controls the operation of the a.c. motor 56 that is used to control the speed of the operation of the lehr conveyor 54, it being understood that similar arrangements (not shown) are provided to control the operation of the a.c. motor 34 for the machine conveyor 32 and the a.c. motor 44 for the cross-conveyor 38. In the system of FIG. 2, a summation is taken of the actual speed, as measured by the belt speed monitor 64, as a negative value, and a theoretical speed, as a positive value. Ideally, the summation will be zero, in which case no adjustment need be made in the setpoint at which the controller 58 controls the operation of the a.c. motor 56. However, when the actual belt speed varies from the theoretical belt speed, the difference between such speeds will be a finite value, and this finite value is then impressed on the controller 58 to adjust the setpoint at which it controls the operation of the a.c. motor. In any case, the signal from the controller 58 is quite weak, and a power amplifier 66 is provided to amplify the value of such signal before it is impressed on the a.c. motor 56.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the equivalents thereof.

What is claimed:

1. A method of transferring freshly formed glass containers from a plurality of dead plates of a glass container forming machine of the individual section type, said method comprising:

providing a machine conveyor adjacent the forming machine;

powering the operation of the machine conveyor by an a.c. motor;

providing a plurality of 90° sweepouts for transferring container from the plurality of dead plates to the machine conveyor;

powering the operation of each of the 90° sweepouts by an a.c. motor;

providing a cross-conveyor extending perpendicularly to the machine conveyor;

powering the operation of the cross-conveyor by an a.c. motor;

providing an endless chain transfer device for transferring containers from the machine conveyor to the cross-conveyor;

powering the chain transfer device by an a.c. motor;

providing an annealing lehr with a conveyor;

powering the operation of the annealing lehr conveyor by an a.c. motor;

providing a lehr loader with a reciprocating pusher bar to transfer groups of containers from the cross-conveyor of the annealing lehr;

powering the reciprocation of the pusher bar of the lehr loader in a direction extending transversely of the cross-conveyor by an a.c. motor;

simultaneously measuring and controlling the rates of operation of the a.c. motors for the 90° sweepouts, the machine conveyor the cross-conveyor, the chain transfer device, the lehr loader pusher bar and the annealing lehr conveyor;

measuring the linear speed of the cross-conveyor to detect stretching of the cross-conveyor; and changing the rate of speed of the motor for the cross-conveyor to compensate for a change in the linear speed of the cross-conveyor due to stretching of the cross-conveyor.

2. A method of transferring freshly formed glass containers from a plurality of dead plates of a glass container forming machine of the individual section type, said method comprising:

providing a machine conveyor adjacent the forming machine;

powering the operation of the machine conveyor by an a.c. motor;

providing a plurality of 90° sweepouts for transferring containers from the plurality of dead plates to the machine conveyor;

powering the operation of each of the 90° sweepouts by an a.c. motor;

providing a cross-conveyor extending perpendicularly to the machine conveyor;

powering the operation of the cross-conveyor by an a.c. motor;

providing an endless chain transfer device for transferring containers from the machine conveyor to the cross-conveyor;

powering the chain transfer device by an a.c. motor;

providing an annealing lehr with a conveyor;

powering the operation of the annealing lehr conveyor by an a.c. motor;

providing a lehr loader with a reciprocating pusher bar to transfer groups of container from the cross-conveyor to the conveyor of the annealing lehr;

powering the reciprocation of the pusher bar of the lehr loader in a direction extending transversely of the cross-conveyor by an a.c. motor;

measuring the linear speed of the machine conveyor to detect stretching of the machine conveyor; and changing the rate of operation of the motor for the machine conveyor to compensate for a change in the linear speed of the machine conveyor due to stretching of the machine conveyor.

3. A method according to claim 2 and further comprising:

measuring the linear speed of the cross-conveyor to detect stretching of the cross-conveyor; and changing the rate of operation of the motor for the cross-conveyor to compensate for a change in the linear speed of the cross-conveyor due to stretching of the cross-conveyor.

4. A method according to claim 2 and further comprising:

providing a container blowoff station adjacent the machine conveyor; and controlling the operation of the blowoff station to discharge containers from the machine conveyor upon a stoppage of any of the cross-conveyor, the chain transfer device, the lehr loader pusher bar or the annealing lehr conveyor.

5. A method according to claim 2 wherein:

the linear speed of the machine conveyor is measured at a location downstream of the location of the transfer of containers from the machine conveyor to the cross-conveyor by the chain transfer device.

6. A method according to claim 1 wherein:

the linear speed of the cross-conveyor is measured at a location downstream of the location of the transfer of containers from the cross-conveyor to the annealing lehr conveyor by the pusher bar of the lehr loader.

7. A method according to claim further comprising:

providing an operator's station to permit an operator to change the rates of operation at which the a.c. motor for the 90° sweepouts, the machine conveyor, the cross-conveyor, the chain transfer device, the lehr loader pusher bar and the annealing lehr conveyor are controlled.

8. A method according to claim 2 and further comprising:

providing a start/stop station to selectively activate or deactivate the controlling of the rates of operation of the a.c. motors for the 90° sweepouts, the machine conveyor, the cross-conveyor, the chain transfer device, the lehr loader pusher bar and the annealing lehr conveyor.

9. A method according to claim 1 in which the operation of the machine conveyor is powered by an a.c. servo motor.

10. A method according to claim 1 in which the operation of the cross-conveyor is powered by an a.c. servo motor.

11. A method according to claim 1 in which the operation of the chain transferring device is powered by an a.c. servo motor.

12. A method according to claim 1 in which the reciprocation of the pusher bar of the lehr loader is powered by an a.c. servo motor.

* * * * *